United States Patent
Chang et al.

(10) Patent No.: US 6,835,584 B2
(45) Date of Patent: Dec. 28, 2004

(54) MICRODISPLAY PIXEL CELL AND METHOD OF MAKING IT

(75) Inventors: Kuang-Yeh Chang, Taipei (TW); Kuo-Yun Kuo, Hsin-Chu (TW)

(73) Assignee: United Microelectronics Corp., Hsin-Chu (JP)

( * ) Notice: Subject to any disclaimer, the term of this patent is extended or adjusted under 35 U.S.C. 154(b) by 0 days.

(21) Appl. No.: 10/605,897

(22) Filed: Nov. 5, 2003

(65) Prior Publication Data

US 2004/0115850 A1 Jun. 17, 2004

Related U.S. Application Data

(62) Division of application No. 09/683,364, filed on Dec. 19, 2001.

(51) Int. Cl.[7] .............................................. H01L 21/00
(52) U.S. Cl. ........................... 438/30; 438/29; 438/151; 438/155
(58) Field of Search .............................. 438/26, 27, 28, 438/29, 30, 151, 152, 153, 154, 155

(56) References Cited

U.S. PATENT DOCUMENTS

| | | | | |
|---|---|---|---|---|
| 6,313,481 B1 | * | 11/2001 | Ohtani et al. | 257/59 |
| 6,380,007 B1 | * | 4/2002 | Koyama | 438/151 |
| 6,563,134 B1 | * | 5/2003 | Chen et al. | 257/59 |
| 6,677,613 B1 | * | 1/2004 | Yamazaki et al. | 257/72 |

* cited by examiner

*Primary Examiner*—Kevin M. Picardat
(74) *Attorney, Agent, or Firm*—Winston Hsu

(57) ABSTRACT

A plurality of active areas are defined on a semiconductor substrate. Then at least one gate is formed on the semiconductor substrate to cover a portion of the active area. Thereafter a plurality of source/drain are formed in the active area not covered by the gate followed by forming a first dielectric layer on the semiconductor substrate to cover the gate and the source/drain. After that, at least one pixel cap top plate is formed atop the first dielectric layer and a capacitor dielectric layer is formed atop the surface of the top plate. Finally, at least one pixel cap bottom plate is formed atop the first dielectric layer to cover the top plate.

17 Claims, 14 Drawing Sheets

US 6,835,584 B2

MICRODISPLAY PIXEL CELL AND METHOD OF MAKING IT

CROSS REFERENCE TO RELATED APPLICATIONS

This application is a division of application Ser. No. 09/683,364 filed on Dec. 19, 2001.

BACKGROUND OF INVENTION

1. Field of the Invention

The present invention relates to a microdisplay pixel cell and method of making it, and more particularly, to a pixel cell with a metal-insulator-metal (MIM) capacitor.

2. Description of the Prior Art

In modern planar display technology, plasma display panel (PDP) and liquid crystal display (LCD) are two main streams. They both constitute numerous display grids called as pixel cells. The former one is applied in a large-sized market and still has a gap from widespread application since the technique for mass production is not broken through yet and cost is high. A thin-film transistor LCD (TFT LCD), which is prevailing in recent years, is a representative of the latter one and is mainly applied in the market smaller than 17 inches. During the fabrication of the TFT LCD products, however, defects such as dots or lines may occur to the LCD. Thus, compensate techniques are required to improve the production yields.

A microdisplay utilizes a silicon chip as a substrate and utilizes a standard CMOS process to form pixel cell matrices, integrated drivers and other electronic devices on the silicon chip. An advantage of the microdisplay is to utilize the CMOS process, since the CMOS process is well developed at the present semiconductor industry. As a result, high stability and reliability can be achieved when compared to the LCD. In addition, using this process, each pixel pitch can be shrank to less than 10 $\mu$m, therefore a high resolutions is obtained. When compared to the PDP, the microdisplay not only has an absolute superiority in cost but also has intrinsic advantages of the microdisplay. In addition, being assisted with adequate projection techniques, the microdisplay can further be applied in markets for large-sized displays. Therefore, a liquid crystal on silicon (LCOS) display, a kind of the microdisplays, attracts many major manufacturers to devote themselves in developing and is the display with highest potentiality.

Please refer to FIG. 1 of a layout of the prior art LCOS display pixel cell 10. The prior art LCOS display pixel cell 10 constitutes a transistor block 18, two pixel cap top plates 20 and one pixel cap bottom plate 22 disposed at either side of the transistor block 18. The pixel cap top plates 20 and the pixel cap bottom plate 22 form a pixel capacitor.

The transistor block 18 comprises four transistors 16. In other words, the transistor block 18 comprises two polysilicon gates 12 electrically connecting to a word line (not shown). Each polysilicon gate 12 crosses two active areas 14. One drain contact plug a is formed in each active area 14 for electrically connecting to a video data line (not shown), and two source contact plugs b are formed in each active area 14 for electrically connecting to a pixel cap top plate 20 respectively. One row select contact plug c is formed on top of each polysilicon gate 12 for electrically connecting to a row select line, which is the above-mentioned word line. Moreover, one contact plug d and one contact plug e are formed, respectively, on top of the pixel cap top plate 20 and the pixel cap bottom plate 22 for electrically connecting to the source contact plug b and ground.

Please refer to FIG. 2 to FIG. 7 of schematic diagrams of a method for forming the prior art liquid crystal on silicon (LCOS) display pixel cell 72. FIG. 2 to FIG. 7 are cross-sectional diagrams along line A-A" shown in FIG. 1. As shown in FIG. 2, the prior art LCOS display pixel cell 72 is made on a semiconductor wafer 30. The semiconductor wafer 30 comprises a P-type silicon substrate 32. A plurality of isolators 34 are disposed on the surface of the P-type silicon substrate 32 for defining an active area for each device. The isolator 34 is usually a field oxide layer formed by a local oxidation (LOCOS) or a shallow trench isolation (STI).

AS shown in FIG. 3, a cleaning process is performed followed by homogeneously depositing a first polysilicon layer 36 on the P-type silicon substrate 32 utilizing a low pressure chemical vapor deposition (LPCVD) process. In the LPCVD process, silane ($SiH_4$) is utilized as a reactive gas, a temperature is controlled in a range from 575° C. to 650° C., and a pressure is in a range from 0.3 to 0.6 torr.

Then as shown in FIG. 4, a first photoresist layer 38 is coated on the surface of the first polysilicon layer 36 followed by performing a first photolithography process to define two pixel cap bottom plate patterns 41 in the first photoresist layer 38. Thereafter a dry etch process is performed to vertically remove the first polysilicon layer 36 along the defined pixel cap bottom plate patterns 41 until reaching the surface of the isolator 34, so two pixel cap bottom plates 42 are formed. Following this, the first photoresist layer 38 is removed.

As shown in FIG. 5, a thermal oxidation is utilizeed to simultaneously form a gate oxide layer 44 composed of silicon dioxide ($SiO_2$) on the surface of the active area 14 and simultaneously form a capacitor dielectric layer 45 on the surface of two pixel cap bottom plates 42. Then, a LPCVD process is performed to form a second polysilicon layer 46 on the surface of the P-type substrate 32 to cover the two pixel cap bottom plates 42.

Thereafter as shown in FIG. 6, a second photoresist layer 48 is formed on the surface of the second polysilicon layer 46. A second photolithography process is performed to define a gate pattern 49 and two pixel cap top plate patterns 51 in the second photoresist layer 48. Then, an anisotropic dry etch process is performed to remove the second polysilicon layer 46 not covered by the second photoresist layer 48 until reaching the surface of the gate oxide layer 44 and the capacitor dielectric layer 45, thus simultaneously form a transistor gate 52 and a pixel cap top plate 54. Finally, the second photoresist layer 48 is removed. The top plate 54, the bottom plate 42 and the capacitor dielectric layer 45 form a complete pixel capacitor 58.

As shown in FIG. 7, a third photoresist layer (not shown) is then formed and an ion implantation process is utilized to form a source/drain (S/D) 63 and 64 in the P-type substrate 32 at either side of the transistor gate 52. Thereafter, a dielectric layer 66 is formed on the P-type substrate 32. After that a photo-etching-process (PEP) is performed to form a plurality of contact holes 68 reaching the surface of the gate 52 in the dielectric layer 66, functioning as a row select contact plug c as shown in FIG. 1 to electrically connect to a subsequent formed row select line. After forming the contact holes 68, a chemical mechanical polishing process (CMP) is performed to the dielectric layer 66 to improve the planarization of the dielectric layer 66 and decrease the difficulty of a subsequent photo-etching-process for forming other contact holes.

Finally, back end processes, such as contact plug processes and metal interconnects processes are performed, respectively, to form the row select line, the inter-metal dielectric (IMD), the drain contact plug a, the source contact plug b, the contact plug d, the contact plug e and the video data line to complete the LCOS display pixel cell 72.

Since the pixel capacitor is located at either side of the transistor and occupies the same plane as the transistor according to the prior art design, this design cause a considerable limitation to chip size shrinkage. In addition, noise of the device cannot be effectively reduced because the length of each metal line in the device cannot be shortened. Moreover, since both the pixel cap top plate and the pixel cap bottom plate are composed of polysilicon, mismatch and residue problems tend to occur due to the effect of nonuniformity between the etching process and process parameter, such as stop layer. This results in deviations from the designed electrical performance of the capacitor.

To improve the electrical performance of the capacitor, the pixel cap top plate and the pixel cap bottom plate may be made of metal. In this case, etching problems can be effectively improved and noise can also be reduced. However, new problems still occur. In a subsequent high temperature process, if there is oxygen in the environment, the metal surface will be oxidized to induce peeling at the interface of the metal and other materials. Moreover, since the transistor gate is formed in the etching process of the second polysilicon layer, the reserved site for gate suffered two etching processes before the gate is complete and thus the quality of the gate is more or less affected. Therefore it is very important to develop a new LCOS display pixel cell design and a process in conjunction with the new design to resolve the above-mentioned problems.

SUMMARY OF INVENTION

It is therefore a primary objective of the present invention to provide a design for a LCOS display pixel cell and a method for forming the LCOS display pixel cell, so as to form a pixel cell with a metal-insulator-metal (MIM) capacitor to resolve the above-mentioned problems.

In a preferred embodiment of the present invention, a plurality of active areas are defined on a semiconductor substrate. Each active area is isolated by an isolator in the periphery of the active area. Then at least one gate is formed on the semiconductor substrate and to cover a portion of the active area. Thereafter, a plurality of source/drain (S/D) are formed in the active area not covered by the gate followed by forming a first dielectric layer on the semiconductor substrate to cover the gate, the source/drain and the isolator. After that, at least one pixel cap top plate is formed atop the first dielectric layer and a capacitor dielectric layer is formed atop the surface of the top plate. Finally, at least one pixel cap bottom plate is formed atop the first dielectric layer to cover the top plate.

It is a feature of the present invention that the pixel capacitor is located on the top of the transistor. Thus, the chip size can be greatly shrunk. In addition, both the pixel cap top plate and the pixel cap bottom plate are composed of metal to have a lower resistivity, and the scan line is formed to contacts with the transistor gate directly, therefore the noise of the device can be reduced, the process temperature can be reduced, and the mismatch problem and residue at the edge of the polysilicon electrode as induced in the prior art can be avoided. A linearity for the pixel cap top plate and the pixel cap bottom plate is better when compared to the prior art method. Moreover, since the top plate and the bottom plate for the pixel capacitor is not adjacent to the transistor gate, a coupling effect between them is effectively inhibited and leads to a less possibility for incurring a potential difference. The quality for the transistor gate is more easily controlled since the transistor gate only suffered one etching process in its formation process according to the present invention.

DETAILED DESCRIPTION

Figure 1:
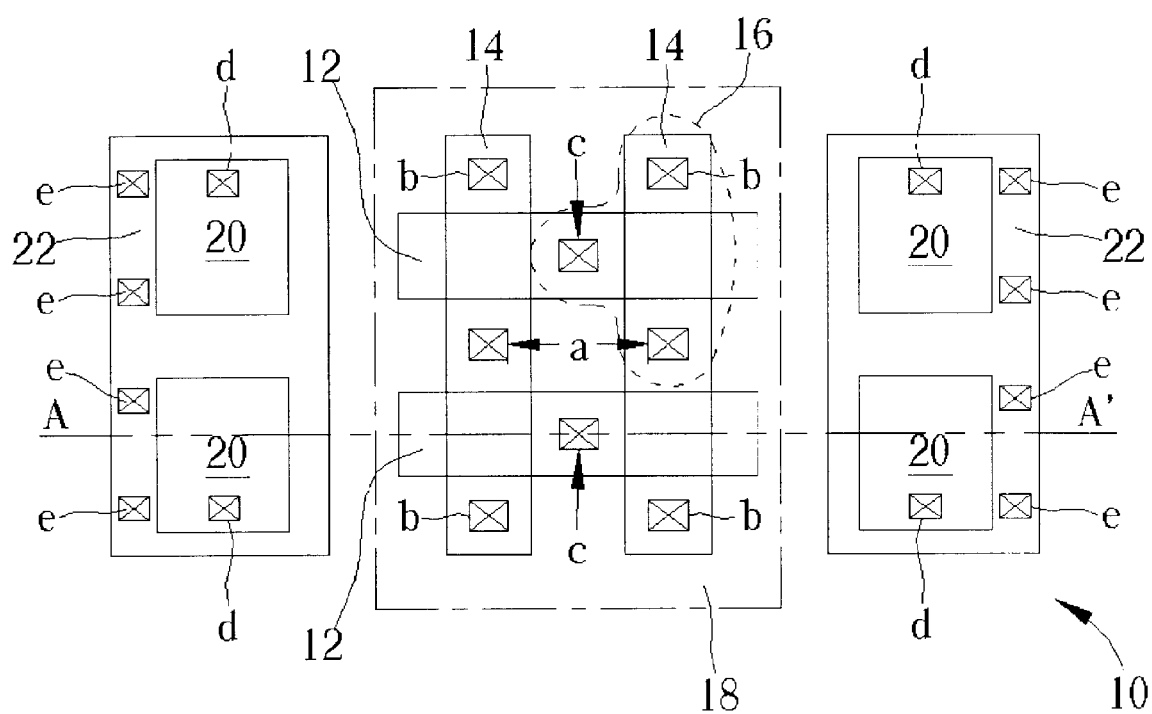
FIG. 1 is a schematic diagram of a layout of the prior art LCOS display pixel cell.
Figure 2:
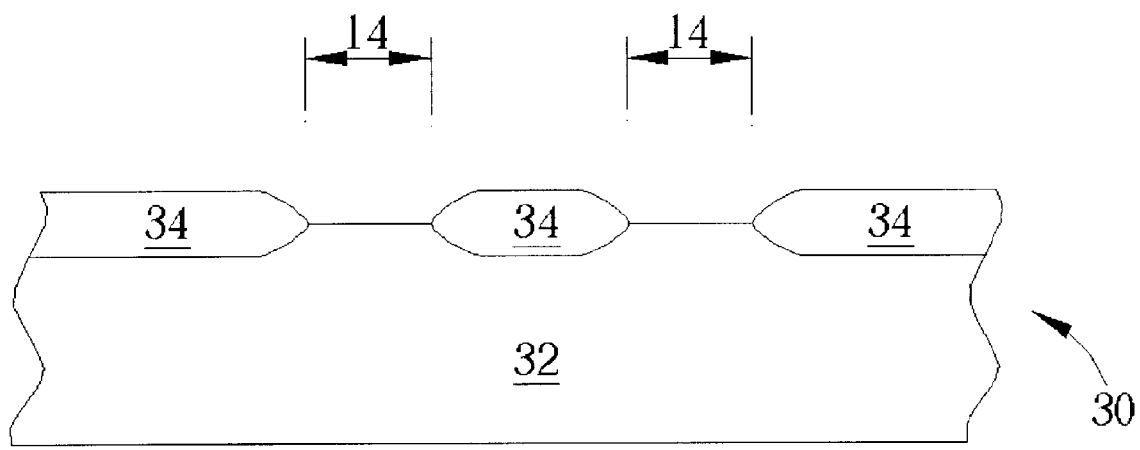
FIG. 2 to FIG. 7 are schematic diagrams of a method of forming a liquid crystal on silicon (LCOS) display pixel cell according to the prior art.
Figure 3:
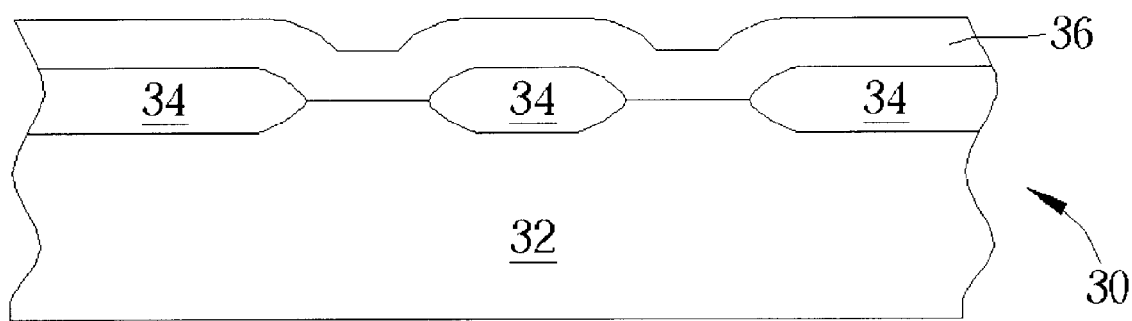
Figure 4:
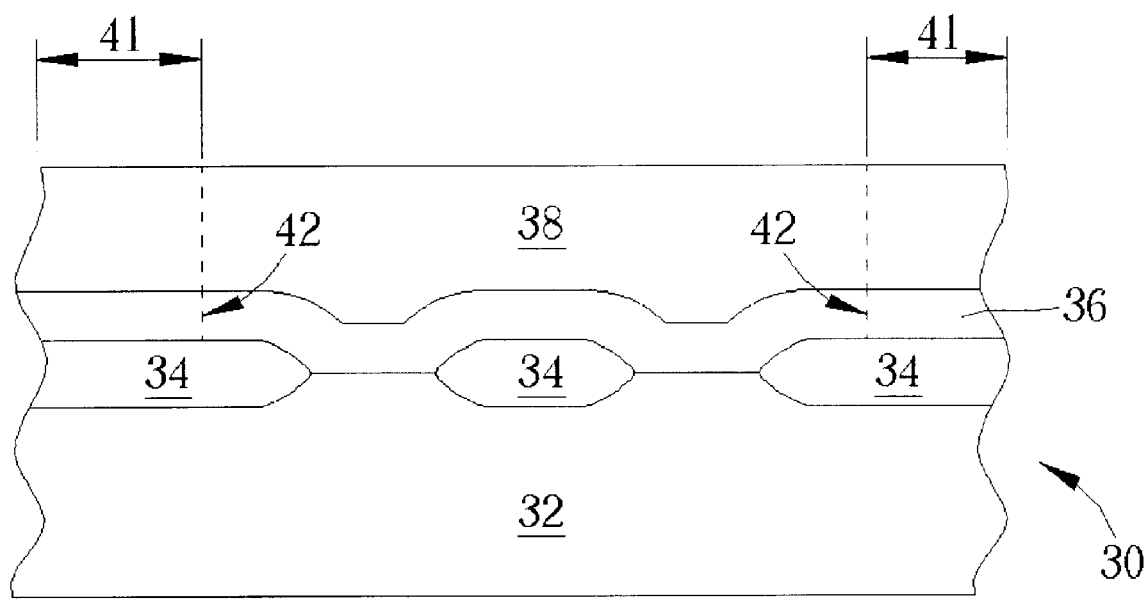
Figure 5:
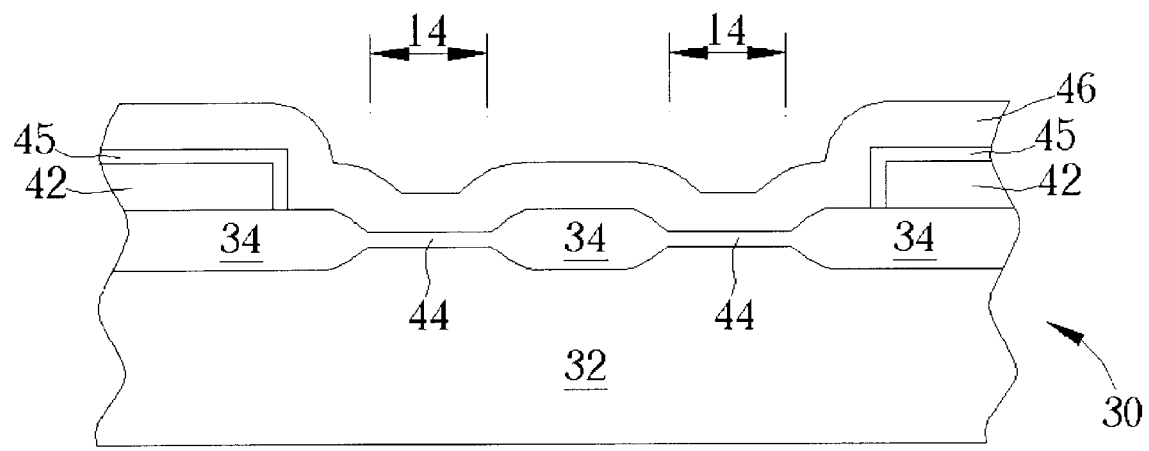
Figure 6:
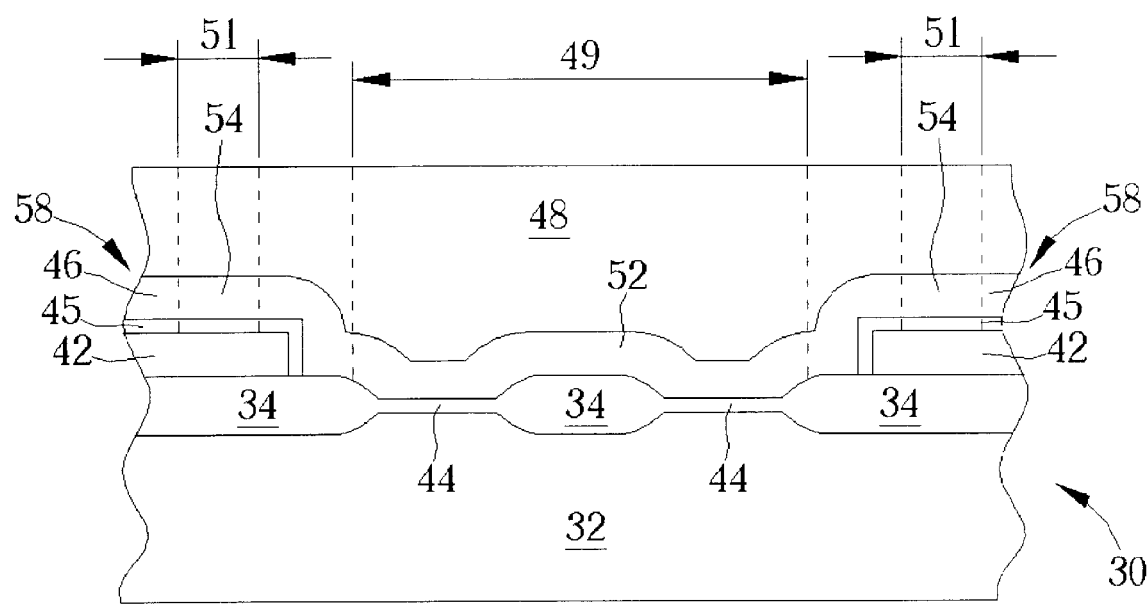
Figure 7:
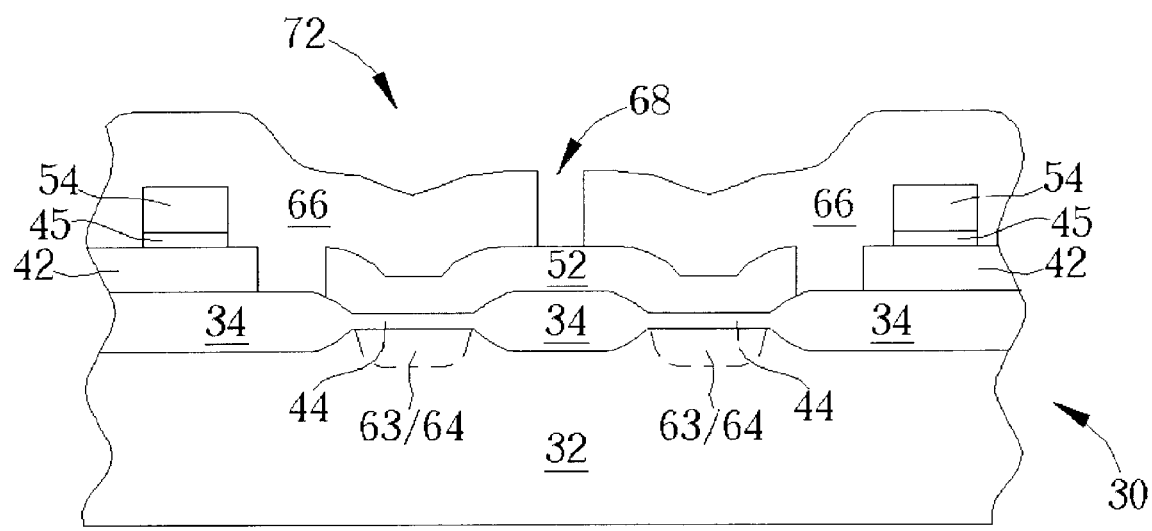
Figure 8:
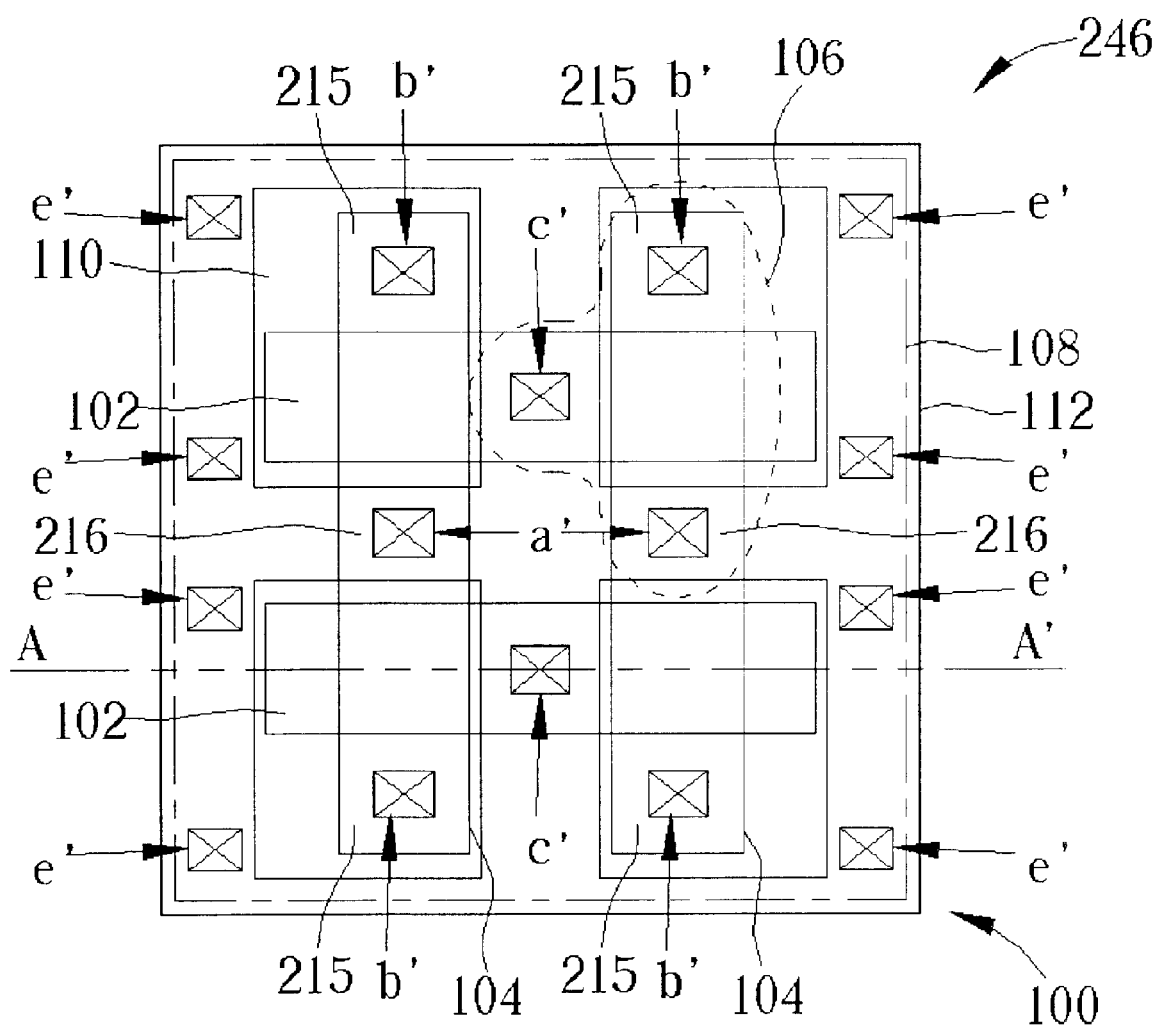
FIG. 8 is a schematic diagram of a LCOS display pixel cell layout of the present invention.

Please refer to FIG. 8 of a layout of the present invention LCOS display pixel cell 100. The LCOS display pixel cell 100 constitutes a transistor block 108 and a pixel capacitor, including four pixel cap top plates 110 and one pixel cap bottom plate 112, disposed atop the transistor block 108.

The transistor block 108 further comprises four transistors 106. In other words, the transistor block 108 comprises two polysilicon gates 102 electrically connecting to a word line (not shown). Each polysilicon gate 102 is across two active areas 104. One drain contact plug a" is formed in each active area 104 for electrically connecting to a video data line (not shown), and two source contact plugs b" are electrically connected to a pixel cap top plate 110 respectively. One row select contact plug c" is formed on top of each polysilicon gate 102 for electrically connecting to a row select line, which is the above-mentioned word line. Moreover, the pixel cap bottom plate 112 is electrically connected to a plurality of grounded contact plugs e'.

Figure 9:
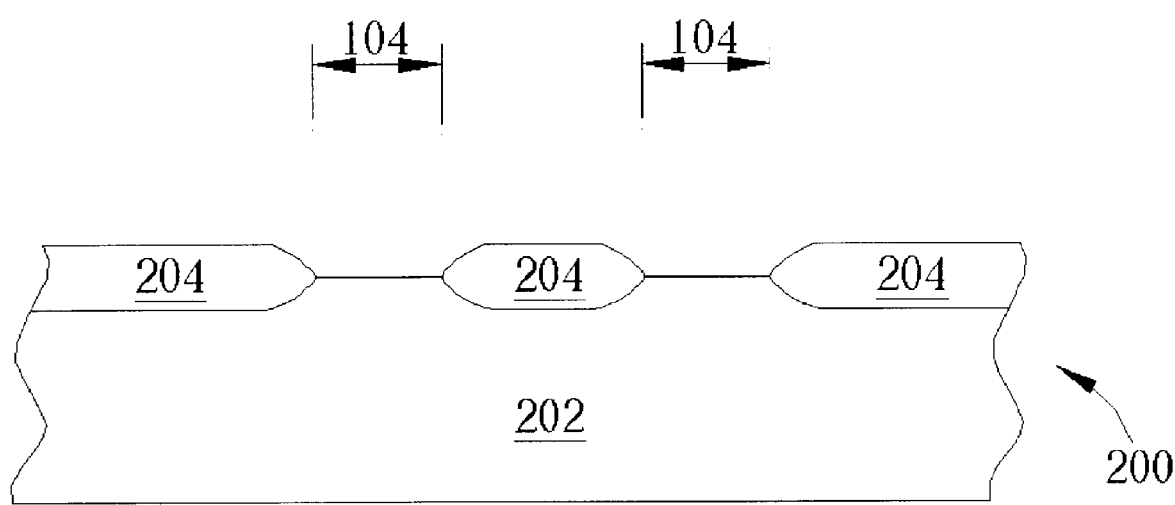
FIG. 9 to FIG. 14 are schematic diagrams of a method of forming a liquid crystal on silicon (LCOS) display pixel cell according to the present invention.

Please refer to FIG. 9 to FIG. 14 of schematic diagrams of forming the present invention liquid crystal on silicon (LCOS) display pixel cell 246. FIG. 9 to FIG. 14 are cross-sectional diagrams along line A-A" in FIG. 8. As shown in FIG. 9, the present invention LCOS display pixel cell 246 is made on a semiconductor wafer 200. The semiconductor wafer 200 comprises a P-type silicon substrate 202. A plurality of isolator 204 are disposed on the surface of the P-type silicon substrate 202 for defining the active area 104 for each device. The isolator 204 is usually a field oxide layer formed by a local oxidation (LOCOS) or a shallow trench isolation (STI).

Figure 10:
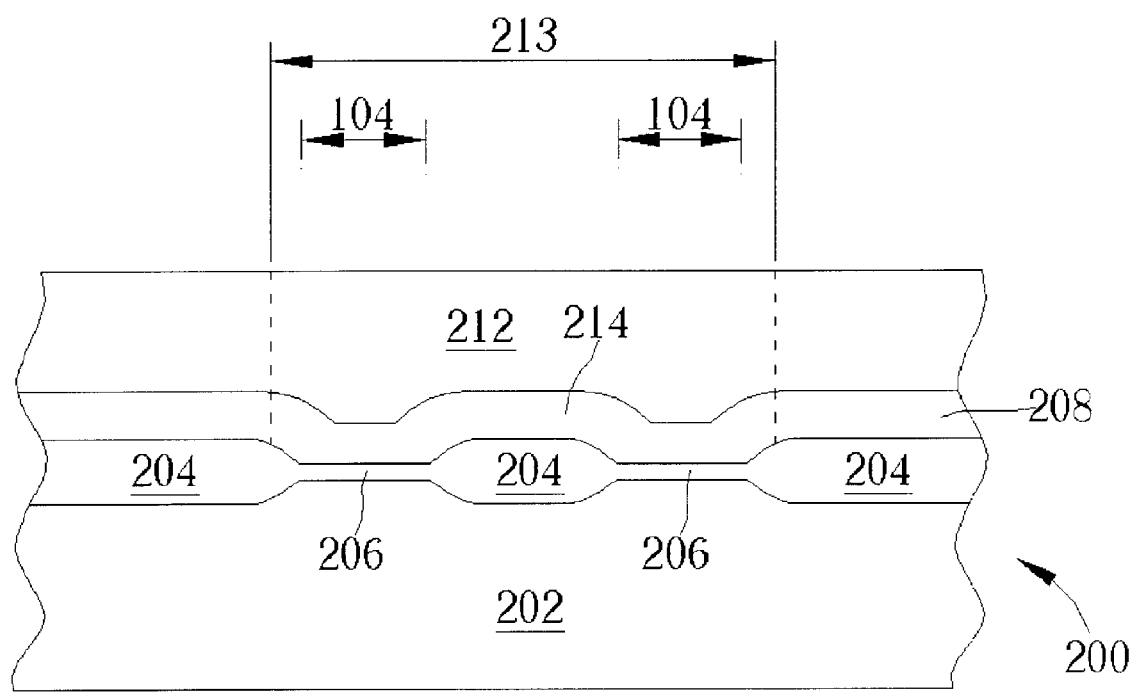

As shown in FIG. 10, a cleaning process is performed followed by forming a gate oxide layer 206 composed of silicon dioxide ($SiO_2$) in each active area 104 of the semiconductor wafer 200 by utilizing a thermal oxidation process. Thereafter a first polysilicon layer 208 is homogeneously deposited on the P-type silicon substrate 202 by a low pressure chemical vapor deposition (LPCVD) process in a CVD process chamber. The process conditions for the LPCVD process is to utilize silane ($SiH_4$) as a reactive gas at a temperature ranging from 575° C. to 650° C. with a pressure ranging from 0.3 to 0.6 torr.

After that, a first photoresist layer 212 is coated on the surface of the first polysilicon layer 208 and a first photolithography process is performed to define a transistor gate pattern 213 in the first photoresist layer 212. Then, a first dry etching process is performed to vertically remove the first polysilicon layer 208 along the defined gate pattern 213 until reaching the surface of the isolator 204 and the gate oxide layer 206 to form a gate 214 of a transistor (not shown). Finally the first photoresist layer 212 is removed.

Figure 11:
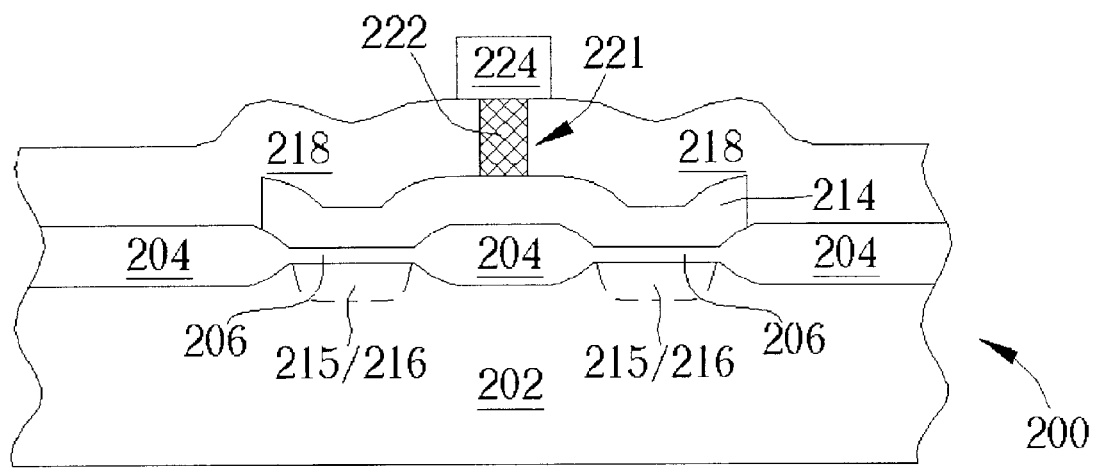

Thereafter, as shown in FIG. 11, a photoresist layer (not shown) is utilized and an ion implantation process is performed to form a source/drain (S/D) 215, 216 of the transistor in the P-type substrate 202 at either side of the transistor gate 214. After that, a first dielectric layer 218 is formed on transistor gate 214 and the isolator 204. The first dielectric layer 218 is formed of silicon dioxide by a chemical vapor deposition (CVD) process, a plasma enhanced chemical vapor deposition (PECVD) process, or a process utilizing tetra-ethyl-ortho-silicate (TEOS). Alternatively, the first dielectric layer 218 sometimes is formed with an additional silicon nitride ($Si_3N_4$) linear underneath by a plasma enhanced chemical vapor deposition (PECVD) process.

Still referring to FIG. 11, a contact hole 221 is then formed in the first dielectric layer 218 to directly reach the transistor gate 214 by utilizing a photo-etching-process (PEP). Before forming the contact hole 221, a chemical mechanical polishing process (CMP process) can be optionally performed to the first dielectric layer 218 to improve the planarization of the first dielectric layer 218 and decrease the difficulty of the photo-etching-process. Thereafter a tungsten (W) metal layer (not shown) is deposited to fill the contact hole 221 and cover the surface of the first dielectric layer 218. A chemical mechanical polishing process is performed to remove a portion of the tungsten metal layer and make the surface of the remaining tungsten metal layer aligned with the first dielectric layer 218 to form contact plug 222.

Finally, a metal deposition process is performed followed by performing a photo-etching-process (PEP) to form a row select line 224 composed of metal atop the contact hole 221. It is worth noticing that the above-mentioned contact hole 221, contact plug 222 and row select line 224 can be formed by utilizing a dual damascene process. In addition, in the present invention, each chemical mechanical polishing (CMP) process is an optional process. Moreover, the present invention can simultaneously define the gate 214 (the gate 102 in FIG. 8) and the row select line (not shown) electrically connected to the gate 214 in the photolithography process for gate 214, to form the connected gate 214 and row select line straightforward. Then, a self-aligned silicide (salicide) process is utilized to reduce the sheet resistance (Rs) of the gate 214, the row select line and the source/drain 215, 216.

Figure 12:
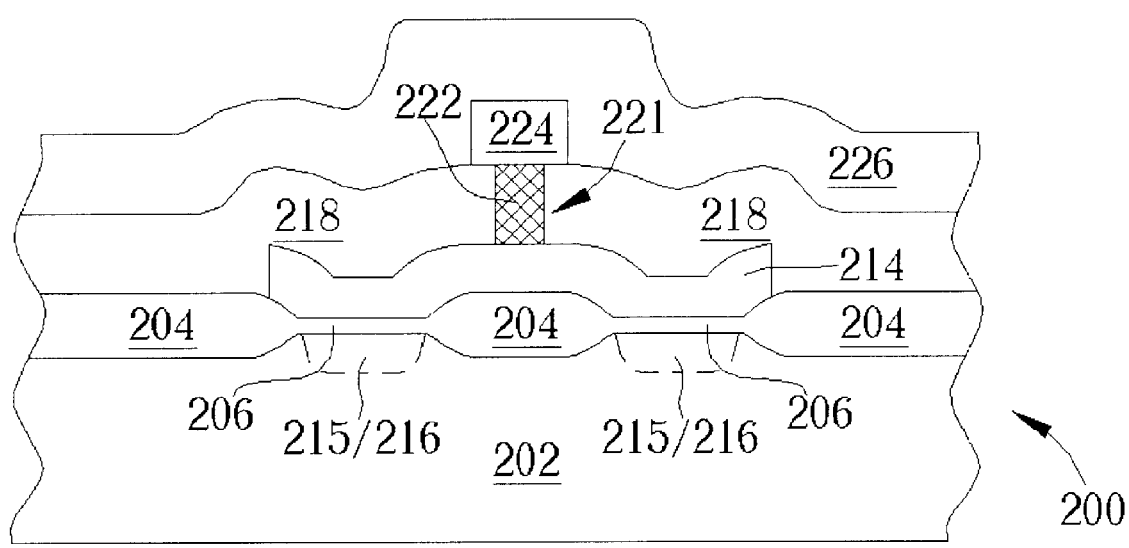

As shown in FIG. 12, thereafter a second dielectric layer 226 is formed on the row select line 224 and the first dielectric layer 218. The second dielectric layer 226 is composed of silicon dioxide or silicon dioxide with silicon nitride ($Si_3N_4$) linear underneath. In the former case, a chemical vapor deposition (CVD) process, a plasma enhanced chemical vapor deposition (PECVD) process, or a process utilizing tetra-ethyl-ortho-silicate (TEOS) is utilized. In the later case, a plasma enhanced chemical vapor deposition (PECVD) process is utilized for silicon nitride deposition.

Figure 13:
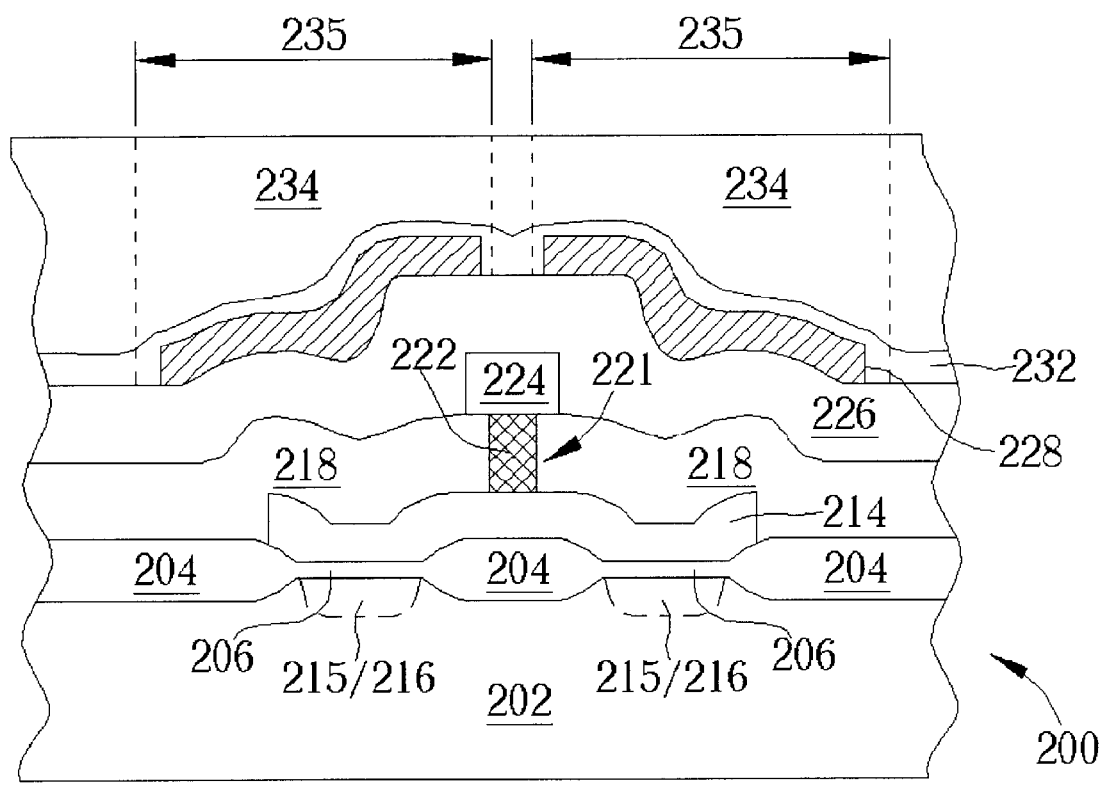

As shown in FIG. 13, a second metal layer (not shown) is formed on the surface of the second dielectric layer 226 by utilizing a physical vapor deposition (PVD) process. The second metal layer is composed of titanium (Ti), titanium nitride (TiN), aluminum (Al), copper (Cu) or an alloy of above-mentioned materials. The process temperature for forming the second metal layer (not shown), which is usually between 200° C. and 400° C., is lower than the process temperature for forming the polysilicon layer in the prior art.

Then, a photo-etching-process (PEP) is performed to the second metal layer to form a pixel cap top plate 228. Thereafter a deposition process is performed to form a third dielectric layer 232 composed of silicon dioxide or silicon nitride ($Si_3N_4$) atop the pixel cap top plate 228 and the second dielectric layer 226 first. Then, a second photoresist layer 234 is formed on the third dielectric layer 232 and a capacitor dielectric layer pattern 235 is formed in the second photoresist layer 234. After that, a second drying etch process is performed to remove the third dielectric layer 232 not covered by the second photoresist layer 234, only retain the third dielectric layer 232 in the periphery of the pixel cap top plate 228 to form the capacitor dielectric layer 236. The second photoresist layer 234 is then completely removed.

Figure 14:
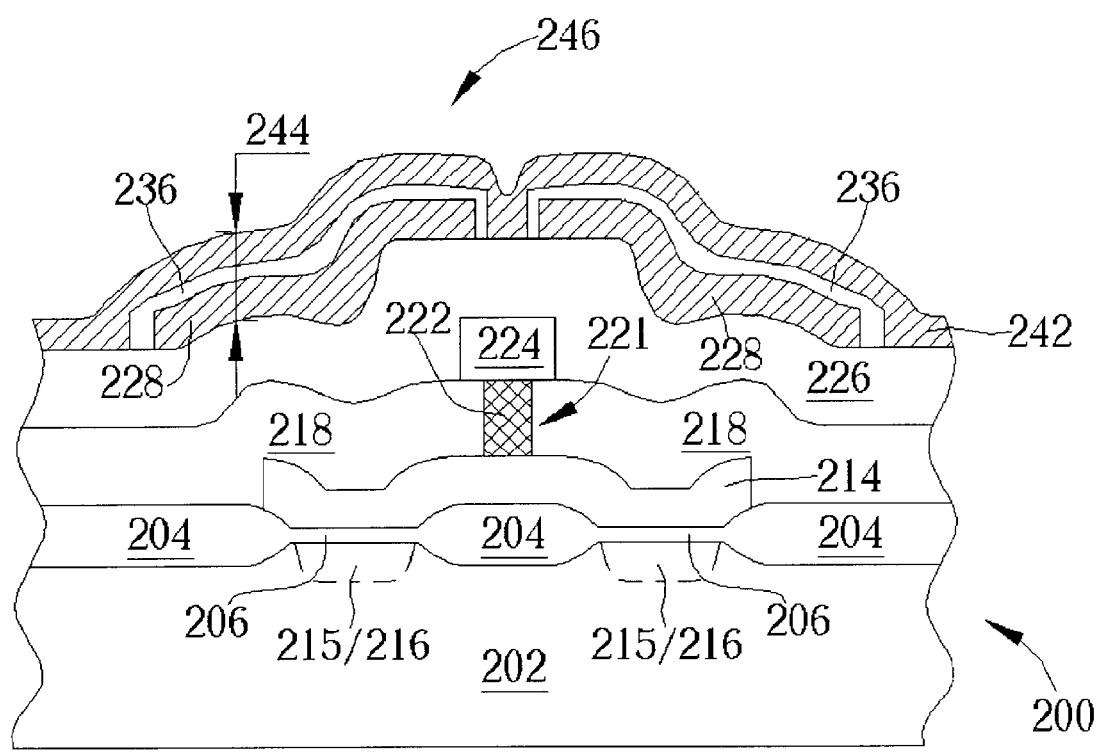

Then as shown in FIG. 14, a patterned third metal layer is formed atop the second dielectric layer 226 and the capacitor dielectric layer 236. The third metal layer is composed of titanium (Ti), titanium nitride (TiN), aluminum (Al), copper (Cu) or an alloy of the above-mentioned materials for use as the pixel cap bottom plate 242. The top plate 228, the bottom plate 242 and the capacitor dielectric layer 236 form a complete pixel capacitor 244.

It is worth noticing that after the formation of the row select line 224, the present invention needs to perform a contact plug process and a metal line process for forming a plurality of drain contact plugs a" and the video data line (not shown) in the second dielectric layer 226 and the first dielectric layer 218, so the drain 216 is electrically connected to the video data line (not shown) through the drain contact plug a". Before the formation of the pixel cap top plate 228 (the pixel cap top plate 110 in FIG. 8), the present invention need to perform a contact plug process for forming a plurality of source contact plugs b" in the second dielectric layer 226 and the first dielectric layer 218, so the source 215 is electrically connected to the top plate 228. Moreover, before or after formation of the pixel cap bottom plate 242 (the pixel cap bottom plate 112 in FIG. 8), the present invention comprises a contact plug process for forming a plurality of contact plugs e" to ground the bottom plate 242 and complete the LCOS display pixel cell 246.

Since the present invention pixel capacitor is located on the top of the transistor, the chip size can be greatly shrunk up to 45%. In addition, since both the pixel cap top plate and the pixel cap bottom plate are composed of metal to have a lower resistivity and the scan line contacts with the transistor gate directly, the noise of the device can be reduced, the process temperature can be reduced, and the mismatch problem and the residue at the edge of the polysilicon electrode can be avoided. A linearity for the pixel cap top plate and the pixel cap bottom plate is better when compared to the prior art method. Moreover, since the top plate and the bottom plate for the pixel capacitor is not adjacent to the transistor gate, the coupling effect between them is effectively inhibited and leads to a less possibility for incurring a potential difference. The quality for the transistor gate is also controlled since the transistor gate only suffering one etching process in its formation process according to the present invention.

In contrast to the prior art method for forming the LCOS display pixel cell, the present invention method increases the integration and the linearity of the metal capacitor, reduces noise and coupling effect, and prevents the mismatch problems and the residue at the edge of polysilicon electrode in the polysilicon etching process.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for making a microdisplay pixel cell, the method comprising:

providing a semiconductor substrate defined with a plurality of active areas;

forming a gate oxide layer and a gate conductive layer sequentially on the semiconductor substrate;

performing a photo-etching-process(PEP) to the gate conductive layer to form two gates on the semiconductor substrate and the each gate covering a portion of the active area;

forming four sources and two drains in the active area not covered by the two gates;

forming a first dielectric layer on the semiconductor substrate to cover the two gates, the four sources and the two drains;

forming at least one row select contact plug in the first dielectric layer to electrically connect to the two gates;

forming at least one row select line atop the first dielectric layer, the row select line being electrically connected to the two gates through the row select contact plug;

forming a second dielectric layer atop the first dielectric layer and covering the row select line;

forming four pixel cap top plates atop the second dielectric layer;

forming a capacitor dielectric layer atop the surface of the top plate; and forming one pixel cap bottom plate atop the second dielectric layer and covering the four top plates.

2. The method of claim 1 wherein the gate conductive layer is a polysilicon layer.

3. The method of claim 1 wherein at least one first contact plug is formed in the first dielectric layer and the second dielectric layer for electrically connecting the four sources and the four top plates.

4. The method of claim 1 wherein at least one second contact plug is formed in the first dielectric layer and the second dielectric layer for electrically connecting the two drains to a video data line.

5. The method of claim 1 wherein the row select line is composed of a metal and is used as a scan line of the microdisplay.

6. The method of claim 1 wherein both the one bottom plate and the four top plates are composed of a metal.

7. The method of claim 6 wherein the metal forming the one bottom plate and the four top plates comprises titanium (Ti), titanium nitride (TiN), aluminum (Al), copper (Cu) or an alloy of above-mentioned materials.

8. The method of claim 1 wherein the microdisplay is a reflective liquid crystal on silicon (LCOS) display.

9. A method for making a microdisplay pixel cell, the method comprising:

providing a semiconductor substrate defined with a plurality of active areas;

forming two gates on the semiconductor substrate and the two gates covering a portion of the active area;

forming four sources and two drains in the active area not covered by the two gates;

forming a first dielectric layer on the semiconductor substrate to cover the two gates, the four sources and two drains;

forming four pixel cap top plates atop the first dielectric layer;

forming a capacitor dielectric layer atop the surface of the four top plates; and forming one pixel cap bottom plate atop the first dielectric layer and covering the four top plates.

10. The method of claim 9 wherein a method for forming the gate comprises:

forming a gate oxide layer and a polysilicon layer sequentially on the semiconductor substrate; and performing a photo-etching-process(PEP) to the polysilicon layer to simultaneously form two gates and at least one row select line electrically connected to the two gates on the semiconductor substrate, the two gates covering a portion of the active area.

11. The method of claim 9 further comprises forming a second dielectric layer under the first dielectric layer and the second dielectric layer covers the two gates, the four sources and the two drains.

12. The method of claim 11 further comprises the following steps:

forming at least one row select contact plug electrically connected to the two gates in the second dielectric layer;

forming at least one row select line atop the second dielectric layer, the row select line being electrically connected to the two gates through the row select contact plug; and forming the first dielectric layer to cover the row select line.

13. The method of claim 12 wherein the row select line is composed of a metal and is used as a scan line of the microdispaly.

14. The method of claim 9 wherein both the one bottom plate and the four top plates are composed of metal and the metal material comprises titanium (Ti), titanium nitride (TiN), aluminum (Al), copper (Cu) or an alloy of above-mentioned materials.

15. The method of claim 9 further comprises forming at least one first contact plug in the first dielectric layer and the second dielectric layer for electrically connecting the four sources and the one top plate.

16. The method of claim 9 further comprises forming at least one second contact plug in the first dielectric layer and the second dielectric layer for electrically connecting the two drains to a video data line.

17. The method of claim 9 wherein the microdisplay is a reflective liquid crystal on silicon (LCOS) display.

* * * * *